United States Patent [19]
Le Noane

[11] Patent Number: 4,769,286
[45] Date of Patent: Sep. 6, 1988

[54] COMPOSITE REINFORCING ELEMENTS AND PROCESSES FOR PRODUCING THEM

[76] Inventor: Georges Le Noane, Kerrougant Bras, 22730 Tregastel, France

[21] Appl. No.: 830,792

[22] Filed: Feb. 19, 1986

[30] Foreign Application Priority Data

Feb. 21, 1985 [FR] France ................ 85 02706

[51] Int. Cl.⁴ ............ D02G 3/00; C03B 23/20; C03C 25/02; B05D 3/02
[52] U.S. Cl. ................. 428/372; 65/3.11; 65/3.2; 65/3.3; 65/3.4; 65/3.44; 427/45.1; 427/54.1; 427/163; 427/177; 427/374.1; 427/385.5; 427/386; 427/389.8; 428/365; 428/366; 428/367; 428/368
[58] Field of Search ............ 427/54.1, 389.8, 45.1, 427/163, 172, 374.1, 385.5, 386; 428/365, 366, 367, 368, 372; 65/3.11, 3.2, 3.3, 3.4, 3.44

[56] References Cited

U.S. PATENT DOCUMENTS

| | | | |
|---|---|---|---|
| 4,125,644 | 11/1978 | Ketley et al. | 427/36 |
| 4,429,216 | 1/1984 | Brigham | 427/121 X |
| 4,512,281 | 4/1985 | Yamanishi et al. | 427/163 X |
| 4,539,219 | 9/1985 | Yamanishi et al. | 427/163 X |
| 4,552,434 | 11/1985 | Murakami et al. | 350/96.30 |

FOREIGN PATENT DOCUMENTS

0113377  7/1984  European Pat. Off. .

Primary Examiner—Thurman K. Page
Attorney, Agent, or Firm—Pollock, Vande Sande & Priddy

[57] ABSTRACT

A composite reinforcing element, especially a reinforcing cable, having a core consisting of a thread of non-metallic material and being coated in a reinforced polymer, and a process for producing it.

9 Claims, 3 Drawing Sheets

COMPOSITE REINFORCING ELEMENTS AND PROCESSES FOR PRODUCING THEM

FIELD OF THE INVENTION

The present invention relates, in general terms, to reinforcing elements and to processes for preparing them and, more particularly, to non-metallic reinforcing elements intended for many uses. They can be used especially in reinforced concretes and reinforced plastics and in the manufacture of optical-fibre cables where it is especially important to provide reinforcing elements without a metallic part.

By reinforcing elements are meant elements usually of cylindrical shape which are intended to reinforce the tensile and/or compressive strength of a material.

Although the reinforcing elements according to the present invention can be employed in various uses, they will be described more particularly with reference to their use in optical-fibre cables.

BACKGROUND OF THE INVENTION

In general terms, an optical-fibre transmission cable can have very varied structures, but a structure which is fairly well known may be referred to as an illustration.

Such a cable consists of a cylindrical support or ring, recessed on its periphery with longitudinal or helical grooves, in which the optical fibres are accommodated.

The cylindrical support has, along its axis, a reinforcing element which ensures the essential mechanical strength of the cable.

The assembly as a whole is, of course, accommodated in a sheath which ensures that the optical fibres are protected.

In some cases, the reinforcing elements can be arranged inside this sheath in addition to or instead of the axial reinforcing element.

These reinforcing elements are required to increase the tensile and compressive strength of the various elements forming the cable, to prevent the shrinkage and relaxation of the elements of the cable, and to allow them to withstand the considerable pulls which can occur, especially during the laying of the cables.

Where optical cables are concerned, it very quickly proved useful to be able to use non-metallic reinforcing elements. These non-metallic reinforcing elements are usually composed of glass or kevlar threads previously braided or otherwise and impregnated with a polymerizable resin; these threads are often obtained by means of a pultrusion process.

Products using thermoplastics are being studied at the present time, but the results are still unsatisfactory.

These products, although they usually behave well or moderately well under tension and compression, at all events sufficiently for most uses, nevertheless have a major disadvantage, namely their production cost. At the present time, this very high production cost makes it very difficult to use them in products such as optical-fibre cables. In fact, since the size of these reinforcing threads usually varies between 500 microns and 2 mm at most, to obtain a high uniformity of the assembly as a whole, very important precautions have to be taken at the moment when the threads are amalgamated with the polymerizable resin, thus necessitating extremely low production speeds (approximately 2 m/min). This low production speed alone is the reason for the very high cost of these reinforcing elements. In fact, it can be estimated that the "material" cost is scarcely a tenth of the "labor/machine" cost of such a product.

As regards the processes still being studied, which use thermoplastic resins, another difficulty is encountered, namely that of binding the various components to obtain a product which has good mechanical characteristics, particularly as regards bending, tension and compression.

SUMMARY OF THE INVENTION

The object of the present invention is, therefore, to obtain non-metallic reinforcing elements of a quality which is substantially equivalent to that of the best products known at the present time and obtained by means of pultrusion, but at markedly lower cost and by means of a new industrial process which is integrated and which makes it possible to achieve high production speeds.

It is known to produce reinforced optical fibres, such as those described, for example, in Japanese patent application No. JP-A-58.82205 published on May 17, 1983.

The major problem where such fibres are concerned is that of reliably maintaining the transmission characteristics and mechanical properties of the central optical fibre.

Likewise, patent applications Nos. EP-0,113,377, FR 2,509,872 and FR 2,483,628 and U.S. Pat. No. 4,331,378 relate to optical cables or fibres.

The subject of the present invention differs clearly from these since it does not relate to optical fibres.

More particularly, the present invention relates to a reinforcing element, especially a reinforcing cable, made of a composite material, characterized in that it has a core consisting of a thread of non-metallic material, the said core being coated in a reinforced polymer.

Without this central thread, the slow and costly processes mentioned above have to be used to obtain satisfactory mechanical stability of the composite structure.

The reinforcing elements according to the invention generally have a diameter of 0.3 to 2 mm, although different diameters are possible.

Preferably, the reinforced polymer consists of a polymer in which are embedded fibres of glass or another non-metallic material, such as fibres of kevlar, carbon, graphite or boron. These reinforcing fibres are preferably continuous and not in the form of cut fibres, although it must be understood that the notion of continuity has practical limits (for example, the capacity of the reels). These fibres can have various structures, i.e., they can be monofilament, but also be in twisted, stranded or braided form; if necessary, it is even possible to use them as reinforcing fibres for non-woven "mats".

It is appropriate to state specifically here that the reinforcing fibres consist of filaments of much smaller diameter than the diameter of the coated thread, so they can easily be amalgamated with the resin.

These reinforcing fibres embedded in the polymer can be grouped in various ways, for example in braids or in strands, these fibres being arranged round the central thread parallel to the axis of the central thread and/or in a spiral of the same axis as the central thread, in the form of one or more concentric cylinders of the same axis as the thread, as emerges from the detailed description. The number and arrangement of the monofilament fibres, twisted, braided or stranded in the concentric layer or layers, and the number of layers around the central thread depend on the subsequent use of the reinforcing element and on the characteristics of rigidity, bending and strength expected of it. The twisted arrangement ensures greater flexibility in the reinforcing element obtained.

The resins used can be very varied; they will usually be cross-linkable resins, such as epoxy resins, for example epoxyacrylates, which are preferred, but it is possible to use other resins, such as polyesters. In some cases, it is even possible to use thermoplastic resins.

The choice of the resin has a bearing on the mechanical characteristics of the reinforcing element obtained, particularly on its characteristics of elongation at break.

As will be seen below, the process adopted varies according to the type of resin used.

The thread of non-metallic material forming the core of the reinforcing element is preferably made of glass or silica. This thread can have an initial tensile strength sufficient to guarantee a modulus intended for the reinforcing element obtained, and its presence ensures that the assembly as a whole has good bending strength.

Furthermore, as will be seen below, it makes it easier to carry out the process for producing the reinforcing elements, by allowing considerable production speeds.

For this purpose, the invention also relates to the production process which involves the complete integration of the manufacture of the composite structure from a glass or silica thread obtained directly by means of the drawing of a bar. It is known, in fact, that the strength of such a silica thread is very quickly impaired by the presence of surface microcracks and because of this a solution involving using a previously stored silica thread is impracticable.

The process of the invention therefore involves producing a composite reinforcing element, in particular a composite reinforcing cable, characterized in that:

a non-metallic material is spun in a spinning zone, the thread is coated by applying the polymerizable or thermoplastic binder and, simultaneously or not, the reinforcing fibres round the said thread directly at the outlet of the continuous spinning zone, and, the composite element obtained in this way is hardened.

All these operations can be carried out by using devices in existence at the present time for the manufacture of optical fibres.

Consequently, if the non-metallic material is glass or silica, the thread will be drawn from a heated bar, for example, by means of a graphite induction furnace.

Coating is carried out in the conventional manner for example, in the technique called "continuous filamentary winding". However, in this type of technique, used especially for manufacturing pipes, the reinforced polymers are arranged continuously on a mandrel.

In the present case, the central thread serves, as it were, as a die. It facilitates both the positioning of the reinforcing fibres, the amalgamation and the penetration of the polymer binder, also preventing core polymerization. This makes it possible to produce reinforcing cables at high speeds, which has not been possible by means of the production techniques used at the present time.

The coating operation can vary, depending on the material of the polymer binder; if the binder is a cross-linkable polymer (as in the case of epoxyacrylate resins), the binder will be deposited on the central thread either in the form of a monomer or in prepolymerized, but nonhardened form. The reinforcing fibres can be arranged round the central thread before, after or during the deposit of the polymer binder. Of course, as is known in the art of reinforced polymers, the fibres can be pre-impregnated with binder, if necessary.

To coat the reinforced polymer binder round the central thread in a selected arrangement of fibres, it is possible to use a double-die device usually employed in wire-drawing, which is supplied, preferably continuously, with polymer binder and reinforcing fibre. This die fed continuously ensures, on the one hand, a good bond between the fibres, the binder and the central thread because of the absence of bubbles and, on the other hand, uniform gauging of the composite element obtained.

According to an alternative form of this process, the thread can be covered with polymer binder previously, before the fibres and binder are arranged, so as to guarantee better protection of the central thread against abrasion by the reinforcing fibres.

In this case, to carry out pre-covering of the central thread there is upstream of the double-die at the outlet of the spinning zone, a central thread coating device supplied continuously with polymer binder and followed by a cross-linking device, such as an oven, where a cross-linkable resin is concerned, or by a cooling zone where a thermoplastic polymer is concerned.

To arrange the reinforcing fibres round the central thread in the selected arrangement, the die has, upstream, at least one reinforcing-fibre supply device which carries the fibre storage reels.

If some fibres are to be arranged spirally, these fibre supply devices are rotary, and the rotational speed of the devices, in relation to the speed of passage of the central thread, then determines the pitch of the spiral.

If the reinforcing fibres are stranded, other devices, such as combs, can equip the fibre supply devices, and because of the flattening of the strands, this allows better penetration of the resin and ensures greater cohesion in the reinforcing element obtained.

The composite element formed in this way will be hardened, in a subsequent step, by means of a process suitable for the type and composition of the polymer. For example, cross-linking can be carried out by heating as a result of the Joule effect or by means of microwaves, the cable passing through an oven, or cross-linking by means of ultra-violet radiation, with the cable passing through an appropriate device. If necessary, moreover, the polymerizable binder can contain components capable of improving the cross-linking such as hardeners or cross-linking accelerators or retarders.

If the polymer binder used is a thermoplastic resin, it will be used in molten form and the fibres will be applied with a certain pressure to penetrate into the polymer. In this case, the hardening step can simply be a cooling step.

The production speed is limited only by the hardening step of the binder.

After the hardening step, the composite element obtained is stored by winding it onto a storage drum, the winding speed of which controls the spinning speed of the central thread and therefore the speed of passage of the central thread, that is to say the production speed of the composite element.

This winding speed is regulated so as to guarantee that the assembly as a whole will have good dimensional stability.

It is also possible to provide, after the hardening step, a step in which the composite element obtained is coated with a fine polymer layer. After the hardening step, the composite element obtained then passes through a resin applicator, followed by an oven or a drying or cooling zone, before being wound onto a storage drum. The polymer selected for this subsequent coating can be similar to the polymer binder or, on the contrary, different to the polymer binder, its nature depending on the subsequent use of the coated element. It is thus possible to improve the stability of the coated composite element in terms of temperature or its compatibility with other materials.

The invention finally relates to a device making its possible to carry out the above process. This is a device comprising:

an assembly for extruding a glass or silica thread from a heated bar, if appropriate, a thread covering assembly and means of hardening the covered thread, an assembly for coating the said thread at the outlet of the spinning assembly, comprising a die through which the thread passes, the said die having means of coating the thread in a polymerizable or thermoplastic binder and a device delivering continuous reinforcing fibres, and means of hardening the coated thread.

BRIEF DESCRIPTION OF THE DRAWINGS

Other advantages of the invention will emerge from the following detailed description and from the attached drawings.

DETAILED DESCRIPTION

Composite reinforcing elements, the structures of which emerge clearly from the attached FIGS. 1 to 4, have been produced.

Figure 2:
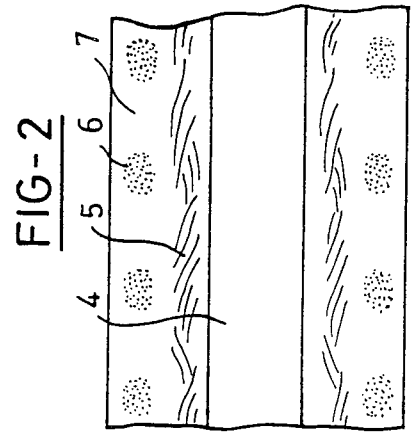
FIGS. 2 and 4 are diagrammatic representations of longitudinal sections of the same composite elements. They have not been hatched in order to provide for a clearer illustration.
Figure 1:
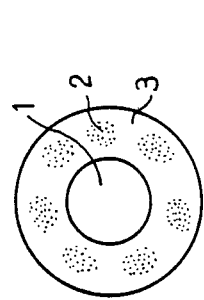
FIGS. 1 and 3 show side elevation of embodiments of composite elements according to the invention.

In a first embodiment represented in FIGS. 1 and 2, the central thread 1 consisting of glass or silica is coated with an epoxyacrylate resin 3 polymerized by means of ultra-violet radiation. The stranded reinforcing fibres, such as 2 are embedded in this resin 3 and arranged in a layer parallel to the axis of the thread 1.

Figure 4:
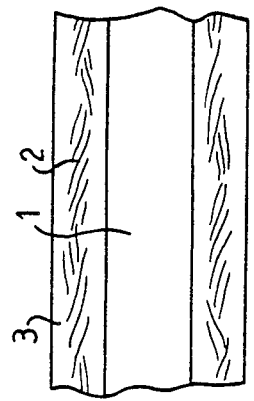
Figure 3:
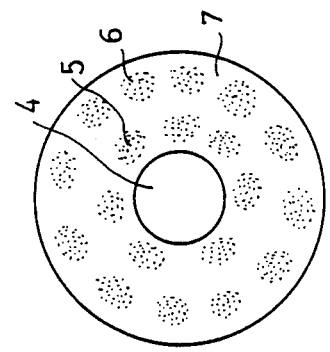

FIGS. 3 and 4 show another embodiment of the reinforcing elements, in which the stranded reinforcing fibres, such as 5, are arranged parallel to the central thread 4 in a first layer, the second layer of reinforcing fibres, such as 6, being arranged spirally according to a coaxial cylinder of the same axis as the central thread 4, these fibres 5 and 6 being embedded in a resin 7.

FIGS. 1-2 and 3-4 show examples of very simple arrangements of reinforcing fibres around the central thread. It will be appreciated that, according to the invention, many alternative forms can be produced, starting from the longitudinal arrangement and the twisted arrangement and by multiplying the layers.

Figure 5:
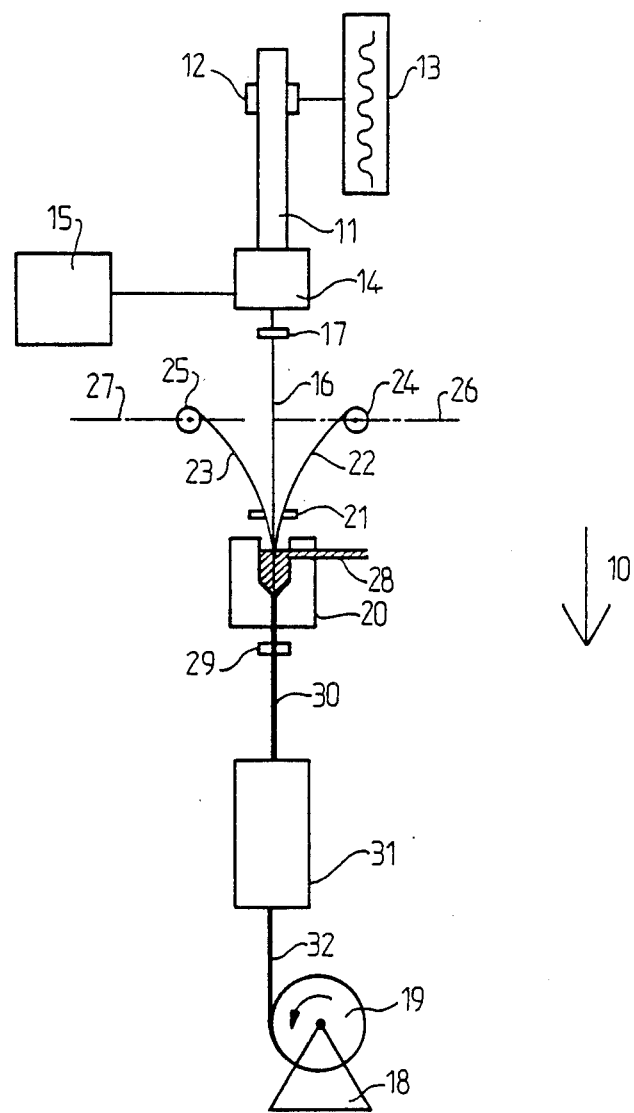
FIG. 5 ia a schematic representation of an alternative embodiment of the process according to the invention.

To manufacture such composite reinforcing elements, the applicant has developed a process of which FIG. 5 gives a diagrammatic representation. This example relates to the manufacture of composite elements of simple structure, such as that of the element shown in FIGS. 1 and 2, with a longitudinal arrangement. Here, the binder is a resin polymerizable under ultraviolet radiation.

The arrow 10 indicates the direction of passage, the device preferably being arranged vertically according to the axis of passage.

The glass or silica bar 11 used is held by a bar-holder 12. The bar-holder 12 is connected to a mechanical slow-lowering device 13 which allows the bar to penetrate at a controlled speed into a graphite induction furnace 14 operating from a generator 15. This type of furnace conventionally equips machines for drawing optical fibres used, in particular, for transmission purposes in telecommunications. This furnace brings the silica or glass to the desired temperature for melting and spinning a thread 16. A detector 17 makes it possible to measure the diameter of the drawn thread, this detector being connected to the system 18 regulating the speed of the drum 19, to avoid variations in the diameter of the central thread 16.

The central thread 16, when it leaves the spinning zone, then penetrates into the die 20, without having undergone any chemical or mechanical attack. The die 20 is equipped, at its inlet, with a laying device 21 which concentrates the fibres 22 and 23 coming from storage reels 24 and 25. The storage reels 24 and 25 are placed on supply devices 26 and 27. These supply devices 26 and 27 are fixed, in the particular case when the reinforcing fibres are arranged parallel to the central thread in the composite element obtained. To ensure that the fibres are positioned properly around the central thread, a mechanical or electromechanical brake device equips each of the storage reels. The die 20 also has a device 28 supplying epoxyacrylate resin. The die 20 is supplied with resin continuously by a suitable device (not shown). The die 20 is also optionally equipped with a gauging device 29 which ensures that the reinforcing element 30 has a constant diameter before the polymerization of the resin. At the outlet of the die, the composite element 30 enters an ultraviolet oven 31 which ensures that the resin is polymerized. The gauged and polymerized composite reinforcing element 32 is wound onto the draw-off drum 19, the speed of which is regulated so as to guarantee that the assembly as a whole has good dimensional stability.

If the reinforcing fibres are wound spirally round the central thread, the fastening devices 26 and 27 of the reels 24 and 25 are rotary, and their rotational speed is controlled and can vary as a function of the desired twisting pitch and the speed of passage of the central thread, these speeds being regulated on the basis of the rotational speed of the draw-off drum 19.

In an alternative embodiment of the process, the applicant has added to the above-described devices, to guarantee better protection of the central thread 16 against possible abrasion by the reinforcing elements, a thread covering device 6 located directly at the outlet of the furnace 14 before the thread enters the die 20. This device comprises a single die which is supplied continuously with epoxyacrylate resin and which deposits a layer of resin approximately 10 microns thick on the central thread 16. The device also includes an ultraviolet oven which hardens the resin covering the thread, before the covered thread penetrates into the die 20.

In another alternative embodiment of the process, the applicant has added to the above-described devices (including or excluding the covering device) a device for coating the reinforcing element obtained at the outlet of the oven 31. This device comprises a single die supplied with polymer and an oven ensuring the polymerization or drying of the polymer applied, before the coated composite reinforcing element obtained is wound onto the drum 19.

In another alternative embodiment of the process, the stranded fibres coming from the storage reels, before being positioned round the central thread, pass into a comb which flattens the strands and guarantees better penetration of the resin and consequently better cohesion of the assembly as a whole.

When the resins are hardenable by means of another technique, the ultra-violet oven or ultra-violet ovens are replaced by suitable devices, namely microwave ovens or Joule-effect ovens, or by cooling zones where thermoplastic polymers are concerned.

Of course, the various process parameters are monitored and compared to obtain a reinforcing element which has good dimensional stability.

The entire apparatus also constitutes an integrated machine guaranteeing a good stability of the outside diameter of the element 32 by means of the die 20, the outside diameter of which has been controlled according to an average speed of passage. This average speed of passage guarantees, after an adjustment of the lowering speed of the bar-holder 12, that the central thread will have a particular size, with variations not exceeding a few microns, and this will consequently give the element as a whole good mechanical stability, the more so because the bare thread 16 does not undergo any mechanical attack before it enters the die 20.

All these data, namely the lowering speed of the bar, the diameter of the bar, the diameter of the thread 16, the diameter of the die and the winding speed on the drum 19, can be programmed very easily, as on conventional cabling machines, and this process, because of the presence of the central thread and the possibility of using resins, such as epoxyacrylate resins polymerizable under ultra-violet radiation, makes it possible to reach speeds of 20 to 150 m/min, depending on the size of the element.

Figure 6:
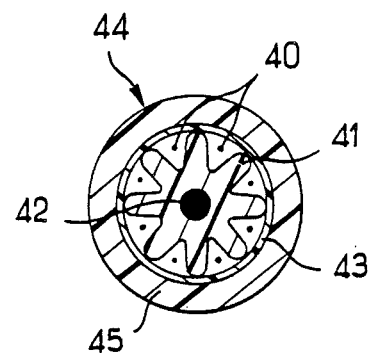
FIGS. 6 and 7 show, in section, exemplary embodiments of an optical cable, in which composite reinforcing elements according to the invention are used.
Figure 7:
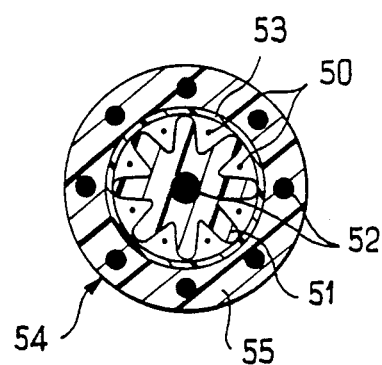

FIGS. 6 and 7 illustrate, as a simple illustration, optical-fibre cables reinforced by reinforcing elements according to the invention.

In FIG. 6, the optical fibres 40 are placed in the grooves of an extruded plastic section 41 with helical grooves. The composite reinforcing element 42 according to the invention is placed at the centre of the section 41. The section 41 is provided with a taping 43, and the cable 44 is also provided with a protective sheath 45 made of PEHD.

In a similar embodiment, the composite reinforcing element 42 can be replaced by several twisted composite reinforcing elements. Likewise, the number of grooves in the section 41 and the number of fibres 40 placed in the grooves can vary.

FIG. 7 shows an optical-fibre cable in cross-section. The fibres 50 are placed in the grooves of an extruded plastic section 51, in the centre of which a composite reinforcing element 52 is arranged. The section is provided with a taping 53, and the protective sheath 55, for example made of PEHD, is itself reinforced by reinforcing elements 52 according to the invention, to form the optical-fibre cable 54.

The optical fibres can be free placed in the grooves, eventually with a little excess length, or grooves can be filled with grease usually used in this application.

EXAMPLE

Composite reinforcing element.

A reinforcing element was produced according to the invention, this having a diameter of 0.7 mm and comprising a central thread with a diameter of 250 microns and seven stranded reinforcing fibres made of E glass with an apparent diameter of 230 microns and consisting of filaments (6 to 9 microns in diameter) with a mass per unit length of 68 g/km and a tensile strength of 4.3 daN, the polymerizable binder being an epoxyacrylate resin polymerized under ultra-violet radiation.

The characteristics of this element are as follows:

modulus of elasticity: 40,000 to 50,000 N/mm$^2$ tensile strength: 40 daN, that is to say $\delta r \approx 100$ daN/mm$^2$ elongation at break: 2 to 2.5% very good bending properties.

This thread was obtained at a speed of 20 to 30 m/min.

I claim:

1. Process for the line production of a composite reinforcing cable, comprising the steps of
   (a) spinning a non-metallic material in a spinning zone in order to obtain a thread;
   (b) coating said thread by applying a polymerizable or thermoplastic binder and binder reinforcing fibers continuously around said thread coaxial with the axis of the central thread directly at the outlet of said spinning zone; and
   (c) hardening the composite element so obtained.

2. Process according to claim 1, wherein, in step (a), said non-metallic material comprises glass or silica spun as a result of the drawing of a glass or silica bar heated in a furnace.

3. Process according to claim 2, wherein, in step (b), said reinforcing fibres are fibres selected from the group consisting of glass, kevlar, carbon, graphite and boron.

4. Process accordig to claim 1, wherein, in step (b), said reinforcing fibres are applied simultaneously with said binder.

5. Process according to claim 1, wherein, in step (b), an epoxy or polyester resin and said reinforcing fibres are applied around said thread and, in step (c), said binder is polymerized in a Joule-effect, ultraviolet or microwave oven.

6. Composite reinforcing cable having a core (1) consisting of a thread of non-metallic material and being coated with a reinforced polymer, said cable being produced by the process claimed in any one of claims 1 to 5.

7. Process according to claim 1, wherein, in step (b), a thermoplastic binder is applied hot and under pressure to said thread and said reinforcing fibres are applied in said thremoplastic binder, and, in step (c), said thermoplastic binder is cooled.

8. Process according to any one of claims 1 to 5, wherein, between steps (a) and (b), said thread is covered directly at an outlet of an extrusion zone, by applying a cross-linkable or thermoplastic polymer continuously around said thread, forming a first cover which is then hardened.

9. Process according to claim 8, wherein said polymer is an epoxyacrylate resin hardened under ultraviolet radiation.

* * * * *